(12) United States Patent
Jaskola

(10) Patent No.: US 12,682,586 B2
(45) Date of Patent: Jul. 14, 2026

(54) LAPAROSCOPIC IMAGE MANIPULATION METHOD AND SYSTEM

(71) Applicant: OLYMPUS Winter & Ibe GmbH, Hamburg (DE)

(72) Inventor: Sascha Jaskola, Hamburg (DE)

(73) Assignee: OLYMPUS Winter & Ibe GmbH, Hamburg (DE)

( * ) Notice: Subject to any disclaimer, the term of this patent is extended or adjusted under 35 U.S.C. 154(b) by 147 days.

(21) Appl. No.: 18/387,930

(22) Filed: Nov. 8, 2023

(65) Prior Publication Data

US 2024/0249487 A1      Jul. 25, 2024

Related U.S. Application Data

(60) Provisional application No. 63/440,939, filed on Jan. 25, 2023.

(51) Int. Cl.
*G06T 19/20*          (2011.01)
(52) U.S. Cl.
CPC .......... *G06T 19/20* (2013.01); *G06T 2210/41* (2013.01); *G06T 2219/2012* (2013.01)
(58) Field of Classification Search
CPC ................. G06T 19/20; G06T 2210/41; G06T 2219/2021
USPC ....................................................... 345/419
See application file for complete search history.

(56) References Cited

U.S. PATENT DOCUMENTS

| | | | |
|---|---|---|---|
| 7,184,063 B2 * | 2/2007 | Shum | G06T 11/001 |
| | | | 345/640 |
| 10,154,239 B2 | 12/2018 | Casas | |
| 10,460,457 B2 | 10/2019 | Heeren | |
| 2009/0096807 A1 * | 4/2009 | Silverstein | G06T 15/08 |
| | | | 345/593 |
| 2015/0374210 A1 * | 12/2015 | Durr | A61B 1/000096 |
| | | | 600/111 |
| 2018/0174311 A1 * | 6/2018 | Kluckner | G06V 10/25 |
| 2019/0094554 A1 * | 3/2019 | Benesh | G06T 11/001 |
| 2019/0365498 A1 * | 12/2019 | Gibby | A61B 90/90 |

(Continued)

OTHER PUBLICATIONS

Rawia Frikha: "Handling occlusion in Augmented Reality surgical training based instrument tracking", Nov. 1, 2016 (Nov. 1, 2016), pp. 1-5, XP093152682.*

(Continued)

*Primary Examiner* — Jin Ge
(74) *Attorney, Agent, or Firm* — Scully, Scott, Murphy & Presser, P.C.

(57)          ABSTRACT

A method for manipulating laparoscopic images taken during a laparoscopic procedure using a video laparoscope. The method including: analyzing the laparoscopic images relative to visibility of an object; calculating a placement of a pre-generated 3D model of the object relative to the location of the object in the laparoscopic images; generating a visual representation of the 3D model; comparing at least one of color information and brightness information of the visual representation of the 3D model and of the laparoscopic images at the location of the 3D model and adjusting the representation of the 3D model based on the comparison in regions where the difference is below a predefined threshold; and generating composite images using the laparoscopic images and the adjusted representation of the 3D model.

20 Claims, 4 Drawing Sheets

{state of the art}

(56) References Cited

U.S. PATENT DOCUMENTS

| | | | |
|---|---|---|---|
| 2020/0213533 A1* | 7/2020 | Zhang | G06T 7/174 |
| 2023/0147826 A1* | 5/2023 | Zhao | G06T 19/006 |
| | | | 345/419 |

OTHER PUBLICATIONS

Du., Chengxu., et al., "Intraoperative navigation system with a multi-modality fusion of 3D virtual model and laparoscopic real-time images in laparoscopic pancreatic surgery: a preclinical study", BMC Surgery (2022) 22:139; pp. 1-8; https://doi.org/10.1186/s12893-22-01585-0.
Ichihashi, Keita, et al., "Estimating Visibility of Annotations for View Management in Spatial Augmented Reality Based on Machine-Learning Techniques", Sensors 2019, 19, 939; doi:10.3390/s19040939, pp. 1-28 www.mdpi.com/jouranl/sensors.
Bertrand, Le Roy, et al., "A case series study of augmented reality in laparoscopic liver resection with a deformable preoperative model", Surgical Endoscopy (2020) 34:5642-5648, https://doi.org/10.1007/s00464-020-07815-x.
Soler, et al., "Real-Time 3D image reconstruction guidance in liver resection surgery", Hepatobiliary Surg Nutr 2014;3(2):73-81, www.thehbsn.org.

* cited by examiner (state of the art)

LAPAROSCOPIC IMAGE MANIPULATION METHOD AND SYSTEM

CROSS-REFERENCE TO RELATED APPLICATION

The present application is based upon and claims the benefit of priority from U.S. Provisional Application No. 63/440,939 filed on Jan. 25, 2023, the entire contents of which is incorporated herein by reference.

BACKGROUND

Field

The present disclosure relates to a method and a system for manipulating laparoscopic images taken during a laparoscopic procedure using a video laparoscope as well as to a non-volatile data storage medium containing instructions for a computer.

Prior Art

In laparoscopic procedures using a video laparoscope, the operator views an image produced by the video laparoscope on a screen, which may be the primary OP monitor. In some cases, the laparoscopic image presented to the operator is enhanced by overlaying the laparoscopic image with a rendering of a 3D model of an organ being operated on or other organic structures. Such 3D models serve for orientation and navigation during the procedure and are generated beforehand based on prior radiological scans of the patient.

Such an overlay of a 3D model will cover parts of the live surgical image, depending on its position and orientation. In case of excessive similarity between the structures shown in the two parts of the composite image, the overlay may be difficult to distinguish from the actual laparoscopic image.

In the case of a transparent or semitransparent overlay, the overlaid 3D model of the organ blends visually with the laparoscopic image. This may lead to loss of detail or, in extreme cases to confusion between the live surgical image in the background and the overlay display in certain details.

Another artifact of the overlay is that the overlaid image of the 3D model of the organ may obstruct the view of surgical instruments inside the laparoscopic image.

SUMMARY

An object is to provide improved apparatus and methods of displaying laparoscopic images augmented by renderings of 3D models.

Such object can be solved by a method for manipulating laparoscopic images taken during a laparoscopic procedure using a video laparoscope by:

analyzing the laparoscopic images relative to visibility of an object;

calculating a placement of a pre-generated 3D model of the object relative to the location of the object in the laparoscopic images;

generating a visual representation of the 3D model;

comparing at least one of color information and brightness information of the visual representation of the 3D model and of the laparoscopic images at the location of the 3D model and adjusting the representation of the 3D model based on the comparison in regions where the difference is below a predefined threshold; and generating composite images using of the laparoscopic images and the adjusted representation of the 3D model.

The composite images can be displayed on a screen.

In embodiments, the laparoscopic images can be manipulated in real-time.

The object of which a 3D model is used can be at least one or several organs and an organic structure.

With the method described here, the 3D model of the object can be rendered as an overlay over the laparoscopic images, and adjusted to have greater contrast to the underlying images, thus fulfilling the goals of better assisting the operator by reducing the risk of confusion between the 3D model visualization and the real laparoscopic images. This can be done by identifying regions of insufficient color or brightness contrast and adjusting the visualization of the 3D model in those regions, such as by increasing the contrast with regard to color and/or brightness.

In embodiments, at least one of the comparison and the adjustment of the visual representation of the 3D model can be done at least one of at pixel level of the laparoscopic images and in segments of multiple pixels. Whereas a pixel level comparison and/or adjustment will result in most detailed composite images, the use of segments of multiple pixels will take less computational time and can be used, among others, for increasing the repetition rate of the enhanced laparoscopic images.

The segmentation in the comparison can differ from the segmentation in the adjustment of the visual representation of the 3D model. For example, the segments in the adjustment of the visual representation of the 3D model can be circular or elliptical and fully encompass the segments used in the comparison. This latter feature can serve to make the rendering of the 3D model more natural and avoid any rastering effects.

In embodiments, the brightness of the laparoscopic images can be reduced and/or the brightness of the visual representation of the 3D model can be increased. Both measures can further increase the contrast between the visualization of the 3D model and the laparoscopic images.

A further embodiment can include detecting a surgical instrument in the laparoscopic images and adjusting the visual representation of the 3D model to avoid obscuring the surgical instrument. This can be done by making the 3D model visualization more transparent in the region of the laparoscopic image containing the surgical instrument or by cutting out the part of the organ that would be obscured by the surgical instrument from the rendering of the 3D model of the object. This can make the surgical instrument appear to be in front of the 3D model of the object in perspective. The detection of the surgical instrument can be performed by at least one of object recognition and edge detection, for example.

In further embodiments, for example further display modes, details from the inner region of the 3D model of the object can be left out, only the outer contours of the 3D model can be rendered or pre-determined edges of the 3D model including the outer contours of the 3D model can be rendered, each of which is known in the art.

The outer contours of the 3D model can be outlined in two highly contrasting colors or brightnesses. By this, the outlines can be visible equally against bright, dark and midtone backgrounds. In color images, the contrasting colors can be chosen to represent complementary colors, such as colors having the greatest contrast to the predominant colors of the laparoscopic images.

A further aspect can reside in a system for manipulating laparoscopic images taken during a laparoscopic procedure using a video laparoscope comprising a video laparoscope, a camera controller configured for controlling the video laparoscope, a computer having a frame grabber configured to capture laparoscopic images from the video laparoscope, and a screen connected to the computer, the computer can be configured to analyze the laparoscopic images relative to visibility of an object, calculate a placement of a pre-generated 3D model of the object relative to the location of the object in the laparoscopic images, generate a visual representation of the 3D model, compare at least one of color information and brightness information of the visual representation of the 3D model and of the laparoscopic images at the location of the 3D model and adjust the representation of the 3D model based on the result of the comparison in regions where the difference is below a predefined threshold, and generate composite images using of the laparoscopic images and the adjusted representation of the 3D model.

The system can embody the same features, characteristics and solutions as the afore-described method.

In embodiments, the computer can be configured to perform at least one of the comparison and the adjustment of the visual representation of the 3D model at least one of at pixel level of the laparoscopic images and in segments of multiple pixels.

In an embodiment, the computer can be configured to at least one of reduce the brightness of the laparoscopic images and increase the brightness of the visual representation of the 3D model.

In an embodiment, the computer can be configured to detect a surgical instrument in the laparoscopic images and adjust the visual representation of the 3D model to avoid obscuring the surgical instrument.

In an embodiment, the computer can be configured to perform the detection of the surgical instrument by at least one of object recognition and edge detection.

The computer can be configured to leave out details from the inner region of the 3D model of the object.

In an embodiment, the computer can be configured to render at least one of the outer contours of the 3D model and pre-determined edges of the 3D model including the outer contours of the 3D model.

In another embodiment, the computer can be configured to outline the outer contours of the 3D model in two highly contrasting colors or brightnesses.

The above-described embodiments and functionalities can reside in a configuration of the computer's frame grabber to the respective purpose, such as if the frame grabber is provided with image manipulation functionality.

Another aspect can reside in a non-volatile data storage medium containing instructions for a computer that can be configured for causing the computer to perform the above-described method. Such instructions can be loaded in a computer or its frame grabber of an above-described system.

BRIEF DESCRIPTION OF THE DRAWINGS

Further features will become evident from the description of embodiments, together with the claims and the appended drawings. Embodiments can fulfill individual features or a combination of several features.

The embodiments described below, without restricting the general intent of the invention, based on exemplary embodiments, wherein reference is made expressly to the drawings with regard to the disclosure of all details that are not explained in greater detail in the text.

In the drawings:

Figures 1, 2:
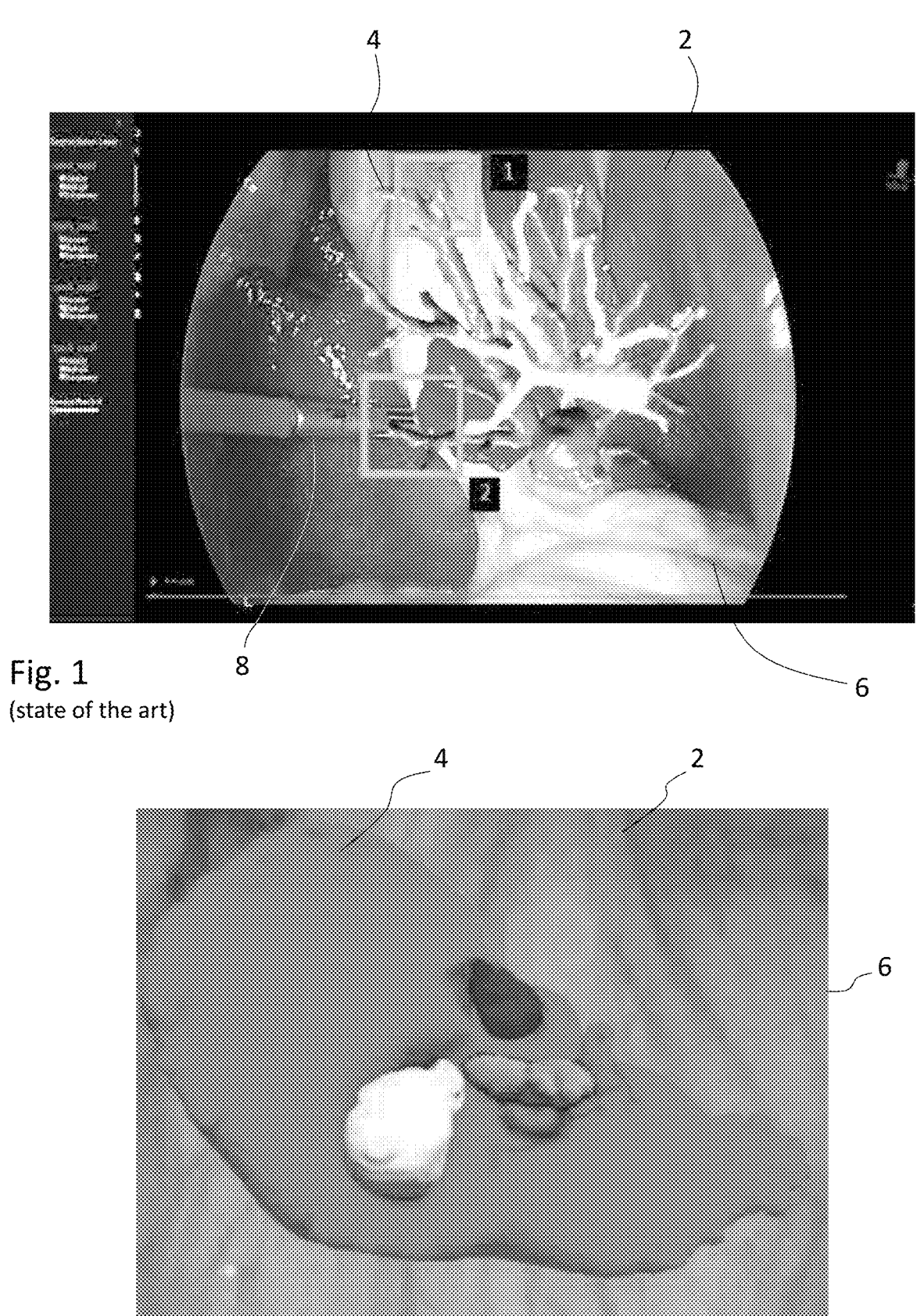
Figure 3:
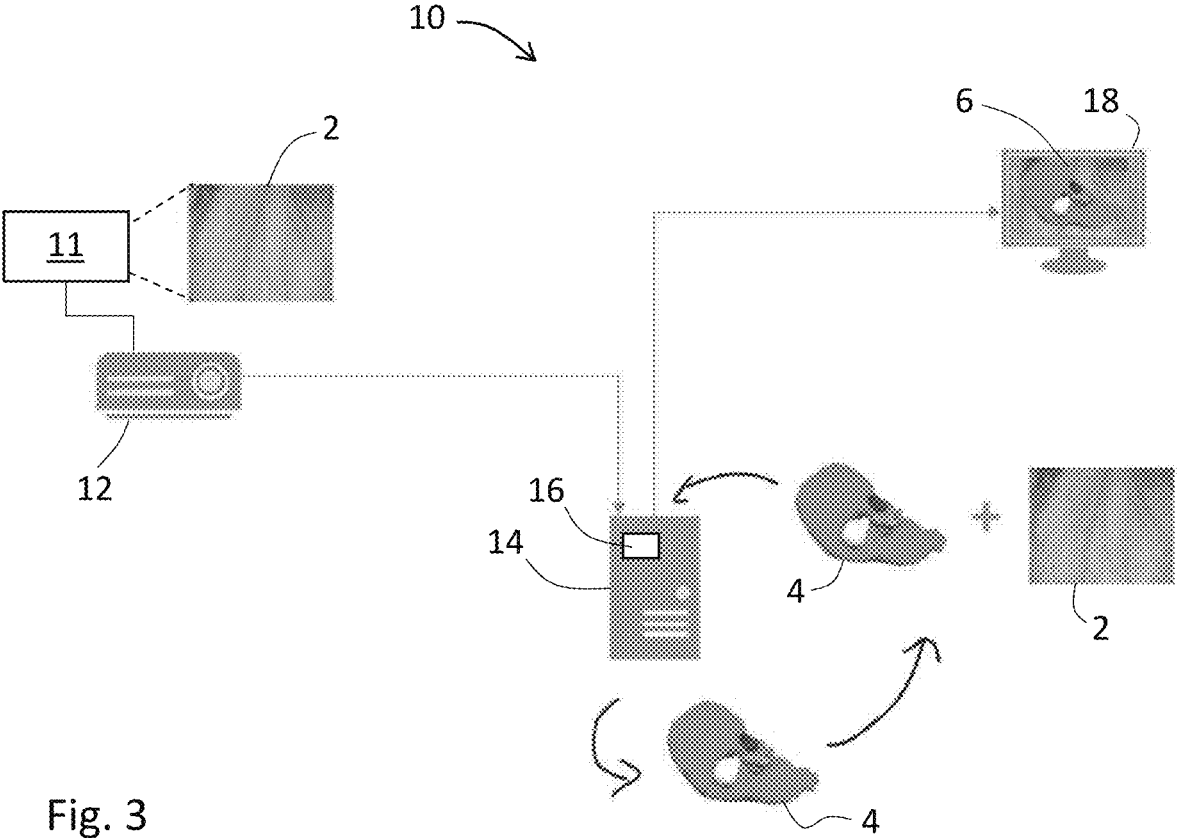
Figure 4:
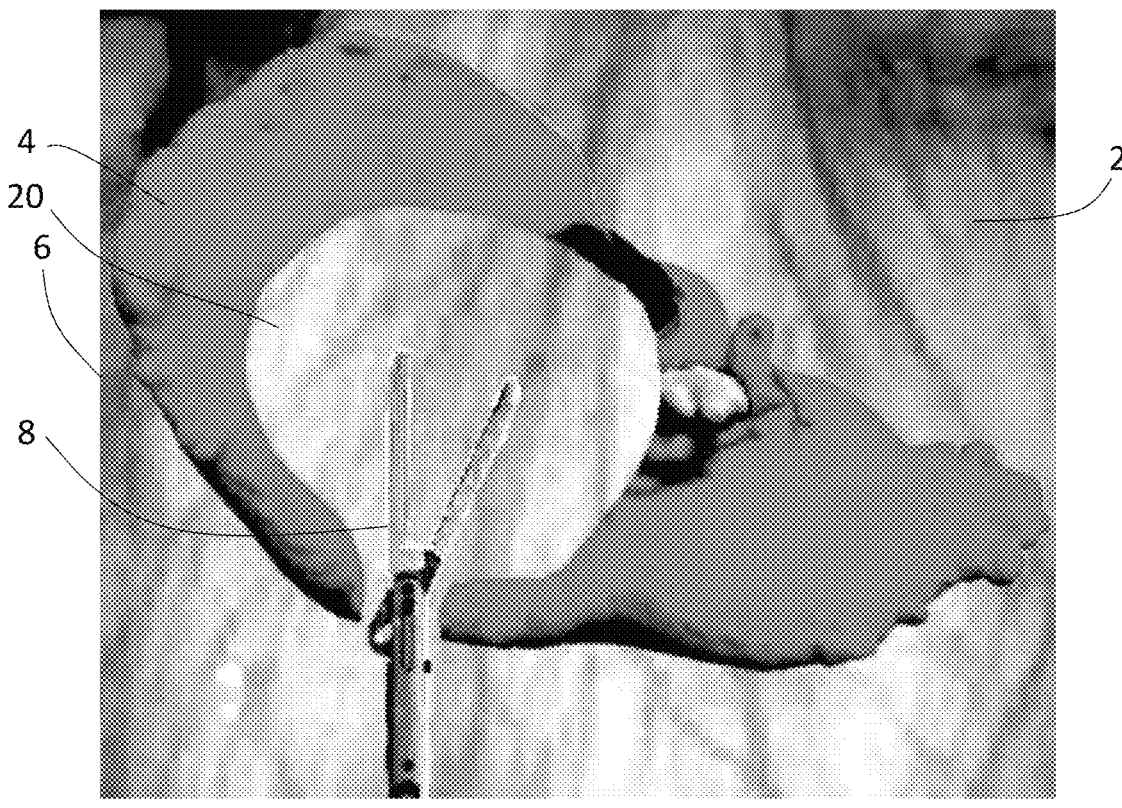
Figure 5:
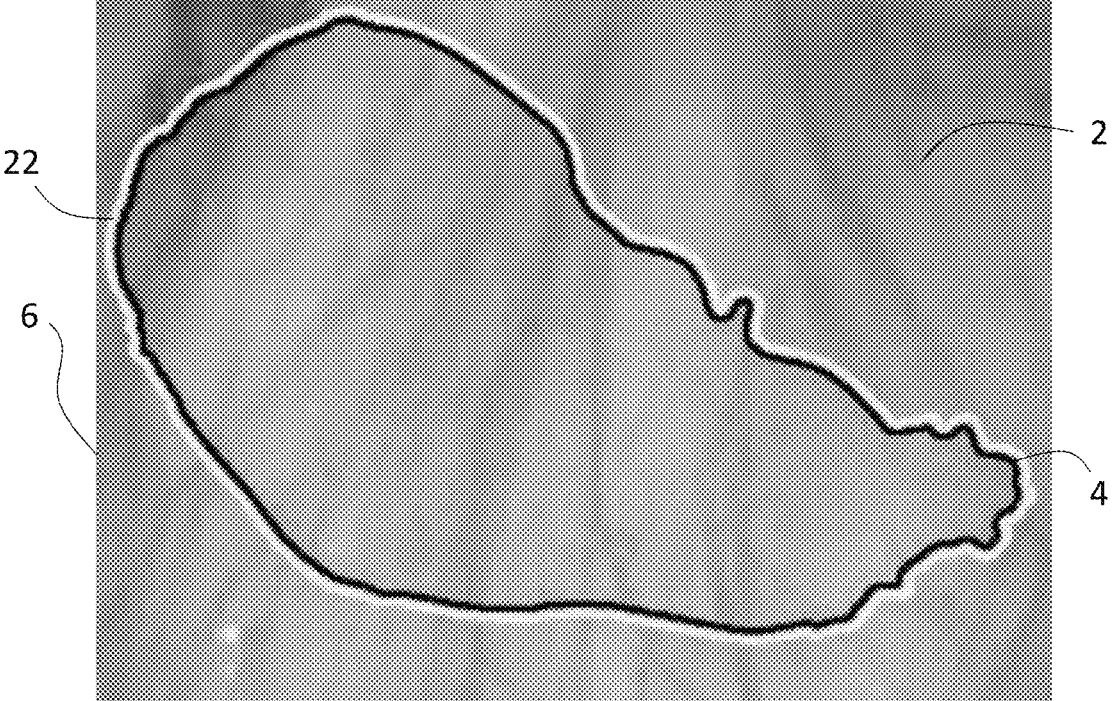
Figure 6:
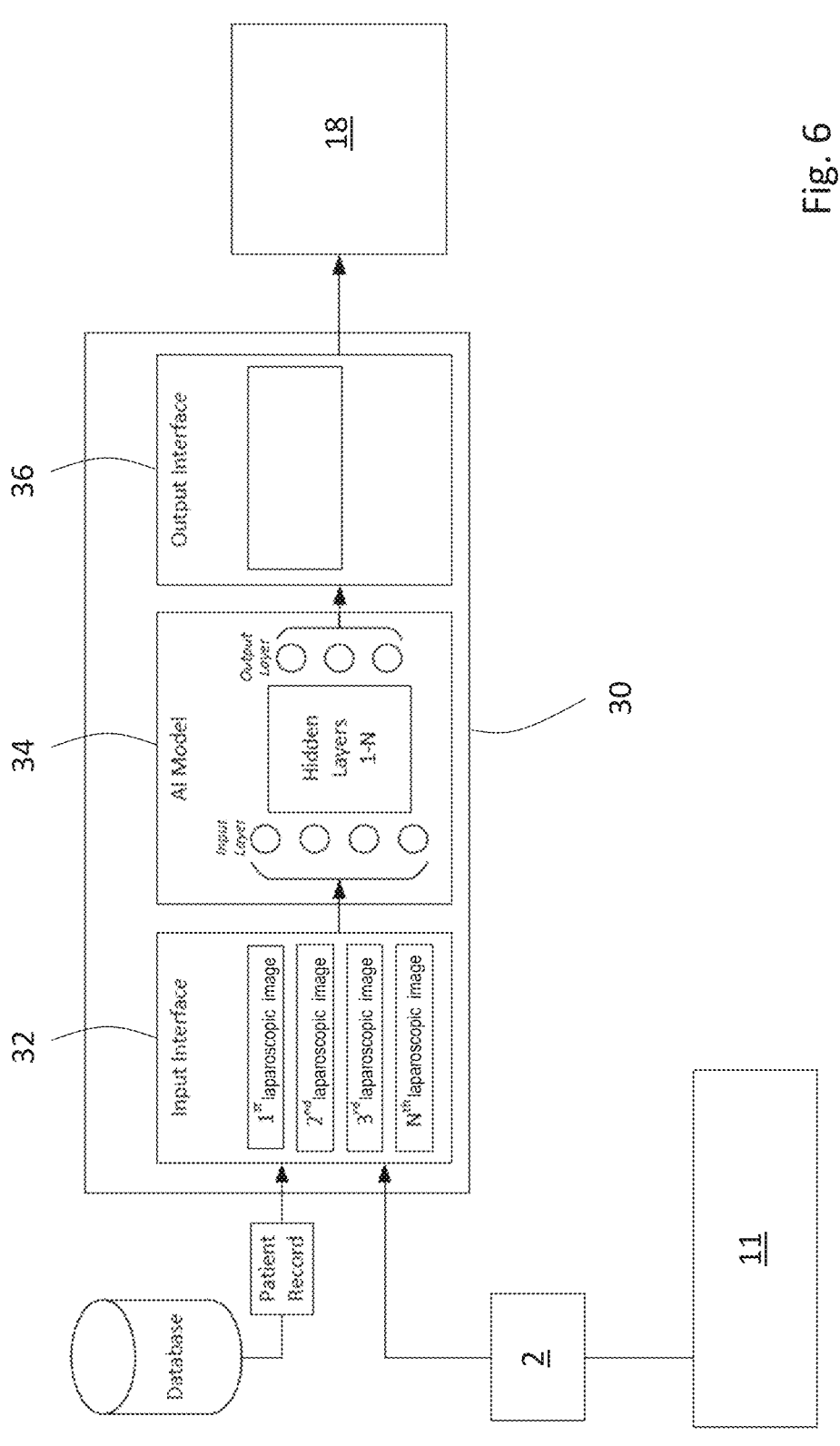

FIG. 1 illustrates a composite image of a laparoscopic procedure produced according to known methods, FIG. 2 illustrates a composite image of a laparoscopic procedure produced according to a first embodiment, FIG. 3 illustrates a schematic representation of an embodiment of a system for manipulating laparoscopic images, FIG. 4 illustrates a composite image of a laparoscopic procedure produced according to a second embodiment, FIG. 5 illustrates a composite image of a laparoscopic procedure produced according to a third embodiment and FIG. 6 illustrates a schematic representation of a machine learning model setup.

In the drawings, the same or similar types of elements or respectively corresponding parts are provided with the same reference numbers in order to prevent the item from needing to be reintroduced.

DETAILED DESCRIPTION

In FIG. 1, a composite image 6 of a laparoscopic procedure produced according to known methods, as could be shown on the central operating monitor of an operating room. A 3D model 4 of an organic structure is rendered and overlayed over a live laparoscopic image 2, thereby highlighting important organic structures in the operating field. The 3D model has, for example, been generated based on prior radiological scans of the patient.

Two regions are highlighted by square boundaries in the composite image 6 of FIG. 1 that are owed to shortcomings of the method with which the rendering of the 3D model has been done. The region having numeral "1" includes a part of the background laparoscopic image 2 that has very similar color and/or brightness values as the rendering of the 3D model 4 of the organic structure, thereby rendering it difficult to distinguish between the 3D model and the real laparoscopic image. The other region having the numeral "2" shows that the rendering of the 3D model 4 obscures the view of a surgical instrument 8 that is presently used to manipulate organic structures in the operating area. Both kinds of artefacts can irritate the surgeon.

FIG. 2 illustrates a composite image 6 of a laparoscopic procedure produced according to a first embodiment. In this first embodiment, a composite image 6 of a laparoscopic image 2 and overlaid 3D model 4 of organs and other organic structures is shown. In the 3D model 4, different organic structures are represented with different colors for enhanced distinction among each other.

The rendering of the 3D model 4 is based on radiological data of the organs and organic structures that were obtained in radiological scans prior to the laparoscopic procedure. The rendering of the 3D model 4 has been generated according to the inventive method, wherein the rendering of the 3D model 4 was compared to the laparoscopic image 2 on a pixel basis and its distance in color and/or brightness adjusted for clearer distinctiveness in regions where the difference in color and/or brightness was too small originally. Due to this enhancement, the surgeon has a clear picture of which part of the composite image 6 represent the life laparoscopic image 2 and which parts represent the 3D model 4.

FIG. 3 illustrates a schematic representation of an embodiment of a system 10 for manipulating laparoscopic images 2. The system 10 comprises the source of laparoscopic images 2, namely a video laparoscope 11, having an image sensor, which is connected to a camera controller 12 that is configured to control the operation of video laparoscope 11 and receive image data of the laparoscopic images 2 from the video laparoscope 11. The camera controller 12 is also connected to a computer 14 having the frame grabber 16, which can be embodied in software or as a hardware card connected to or inserted in computer 14. Frame grabber 16 is configured to process the individual frames of laparoscopic images 2. The manipulation of the individual frames of laparoscopic images 2 can be done inside the frame grabber 16, or computer 14, as the case may be.

Computer 14, or frame grabber 16, as the case may be, has in its memory a 3D model 4 of organs or organic structures of the patient who is being examined with the video laparoscope 11 and configured to match the location and orientation of the 3D model 4 with the life surgical laparoscopic images 2. Once the location and orientation of the 3D model 4 relative to the laparoscopic images 2 is established, software running on computer 14 or frame grabber 16, as the case may be, combines the laparoscopic images 2 with a rendering of the 3D model 4 to form a composite image 6 which then is displayed on a screen 18.

FIG. 4 illustrates a composite image 6 of a laparoscopic procedure produced according to a second embodiment of the method. Whereas the basic steps undertaken in a manner as described with regard to FIG. 2 remain the same, a surgical instrument 8 has been detected in the laparoscopic image 2. In order to grant the surgeon a full and unobstructed view, the immediate vicinity of the surgical instrument 8 is defined as a cutout region 20 and removed from the rendering of the 3D model 4, thus clearing the view of surgical instrument 8 and its vicinity. The remainder of the rendering of 3D models 4 provides the surgeon with visual information regarding orientation and location of the operating area displayed in laparoscopic image 2.

FIG. 5 illustrates a composite image of a laparoscopic procedure produced according to a third embodiment. In this case, the 3D model 4 of the organic structure overlays over the real time laparoscopic image 2 solely as an outline, in this case a high contrast contour 22. The high contrast contour 22 has the form of a double line of different colors, the two lines being immediately adjacent to one another. In this case, one of the lines is white and the other black, since white and black provide the starkest possible contrast in brightness. Such a high contrast contour 22 will be visible over any background structures, since in regions with low brightness, the white line will stand out whereas in regions with high brightness, the black line will stand out. In addition or alternatively to the black and white lines, colored lines having a high color contrast can be used. The colors can also be chosen to have the best possible color contrast to the red color background of typical laparoscopic images 2.

The high contrast contour 22 of the third embodiment shown in FIG. 5 can be an alternative representation of the 3D model 4 to those shown in FIGS. 2 and 4.

FIGS. 2, 4 and 5 also show further differences and variations that can be used to enhance the contrast between the representation of the 3D model 4 and the background laparoscopic image 2, such as increasing the brightness of the rendering of the 3D model 4, decreasing the brightness of the background laparoscopic image 2 or increasing contrast and/or color contrast in one of the two images, such as the rendering of 3D model 4.

FIG. 6 illustrates a schematic diagram of an exemplary schematic representation of a machine learning model 30 setup that is configured to recognize objects, such as organs, organic structures or surgical tools in the laparoscopic images 2 supplied as input features by video laparoscope 11. In various embodiments, the machine learning model 30 includes an input interface 32 through which 3D model data which are specific to a patient are provided as input features to an artificial intelligence (AI) model 34, a processor which performs an inference operation in which the laparoscopic images 2 and the 3D model data are applied to the AI model 34 to generate a location and orientation of the organs or organic structures represented in the 3D model, and possibly of surgical instruments that can be visible in the laparoscopic images 2. Based on the output of the AI model 34, a composite image 6 of the laparoscopic images 2 overlaid with a rendering of the 3D model 4, which can be refined upon detecting a surgical instrument 8 in the laparoscopic images 2, can be generated and shown to a user, e.g., a clinician, on a screen 18.

In some embodiments, the input interface 32 can be a direct data link between the machine learning model 30 and one or more medical devices that generate at least some of the input features. For example, the input interface 32 can transmit laparoscopic images 2 directly to the machine learning model 30 during a therapeutic and/or diagnostic medical procedure. Additionally, or alternatively, the input interface 32 can be a classical user interface that facilitates interaction between a user and the machine learning model 30. For example, the input interface 32 can facilitate a user interface through which the user can manually enter laparoscopic images 2. Additionally, or alternatively, the input interface 32 can provide a machine learning model 30 with access to an electronic patient record from which one or more laparoscopic images or 3D model data can be extracted as input features. In any of these cases, the input interface 32 is configured to collect one or more of the input features in association with a specific patient on or before a time at which the machine learning model 30 is used to assess the presence, location and orientation of organs, organic structures and/or surgical instruments.

Based on one or more of the above input features, the processor performs an inference operation using the AI model to generate the above-described system output. For example, input interface 32 can deliver the laparoscopic features into an input layer of the AI model 34 which propagates these input features through the AI model 34 to an output layer in an output interface 36. The AI model 34 can provide the system 10 the ability to perform tasks, without explicitly being programmed, by making inferences based on patterns found in the analysis of data. AI model 34 explores the study and construction of algorithms (e.g., machine-learning algorithms) that can learn from existing data and make predictions about new data. Such algorithms operate by building an AI model 34 from example training data in order to make data-driven predictions or decisions expressed as outputs or assessments.

There are two common modes for machine learning (ML): supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed. Federated learning enables multiple actors to build a common, robust machine learning model without sharing data, thus allowing to address critical issues such as data privacy, data security, data access rights and access to heterogeneous data.

In some examples, the AI model can be trained continuously or periodically prior to performance of the inference operation by the processor running the AI model 34. Then, during the inference operation, the patient specific input features provided to the AI model 34 can be propagated from an input layer, through one or more hidden layers, and ultimately to an output layer 36 that corresponds to the location, orientation and type of structure found in the laparoscopic images. For example, the AI model 34 can identify the type, location and orientation of specific organs or organic structures represented in the patient specific 3D model, or the location and, if applicable, type and/or orientation, of a surgical instrument, in the laparoscopic images 2.

During and/or subsequent to the inference operation, the thus found locations, types and/or orientations of objects can be communicated to the user via a user interface (UI), such as by rendering the correspondingly positioned and oriented 3D model 4. The AI model 34 can also have as an output information that aids to define a cutout region 20 in the rendering of the 3D model 4 for composite images 6 in the presence of a surgical tool 8.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE SIGNS 2 laparoscopic image
4 3D model
6 composite image
8 surgical instrument
10 system
11 video laparoscope
12 camera controller
14 computer
16 frame grabber
18 screen
20 cutout region
22 high contrast contour
30 machine learning model
32 input interface
34 AI model
36 output interface

The invention claimed is:

1. A method for manipulating laparoscopic images taken during a laparoscopic procedure using a video laparoscope, the method comprising:
    analyzing the laparoscopic images relative to visibility of an object;
    calculating a placement of a pre-generated 3D model of the object relative to a location of the object in the laparoscopic images;
    generating a visual representation of the 3D model;
    comparing at least one of color information and brightness information of the visual representation of the 3D model and of the laparoscopic images at the location of the 3D model and adjusting the visual representation of the 3D model, wherein adjusting the visual representation of the 3D model comprises adjusting the visual representation of the 3D model to have greater contrast to the laparoscopic images based on the comparison in regions where a difference in at least one of color information and brightness information between the 3D model and the laparoscopic images is below a predefined threshold;
    detecting a surgical instrument in the laparoscopic images and adjusting the visual representation of the 3D model to avoid obscuring the surgical instrument; and
    generating composite images using the laparoscopic images and the adjusted visual representation of the 3D model.

2. The method according to claim 1, further comprising displaying the composite images on a screen.

3. The method according to claim 1, further comprising manipulating the laparoscopic images in real-time.

4. The method according to claim 1, wherein the object being at least one of one or several organs and an organic structure.

5. The method according to claim 1, wherein at least one of the comparison and the adjustment of the visual representation of the 3D model is done at least one of at pixel level of the laparoscopic images and in segments of multiple pixels.

6. The method according to claim 5, wherein segmentation in the comparison differs from segmentation in the adjustment of the visual representation of the 3D model.

7. The method according to claim 6, wherein segments in the adjustment of the visual representation of the 3D model being circular or elliptical and fully encompassing segments in the comparison.

8. The method according to claim 1, wherein the adjusting comprises at least one of reducing the brightness of the laparoscopic images and increasing the brightness of the visual representation of the 3D model.

9. The method according to claim 1, wherein the detection of the surgical instrument comprises at least one of object recognition and edge detection.

10. The method according to claim 1, wherein the adjusting comprises at least one of leaving out details from an inner region of the 3D model of the object, rendering only outer contours of the 3D model and rendering pre-determined edges of the 3D model including outer contours of the 3D model.

11. The method according to claim 10, wherein the rendering of the outer contours of the 3D model or the rendering of the pre-determined edges of the 3D model comprises outlining the outer contours of the 3D model in two contrasting colors or two brightnesses.

12. The method according to claim 1, wherein adjusting the visual representation of the 3D model to avoid obscuring the surgical instrument further comprises adjusting the visual representation of the 3D model such that the surgical instrument is visually presented in front of the 3D model.

13. A system for manipulating laparoscopic images taken during a laparoscopic procedure using a video laparoscope, the system comprising:

a video laparoscope;

a camera controller configured to control the video laparoscope, a computer having a frame grabber configured to capture laparoscopic images from the video laparoscope, and a screen connected to the computer, the computer being configured to:

analyze the laparoscopic images relative to visibility of an object;

calculate a placement of a pre-generated 3D model of the object relative to a location of the object in the laparoscopic images;

generate a visual representation of the 3D model;

compare at least one of color information and brightness information of the visual representation of the 3D model and of the laparoscopic images at the location of the 3D model and adjust the visual representation of the 3D model, wherein adjusting the visual representation of the 3D model comprises adjusting the visual representation of the 3D model to have greater contrast to the laparoscopic images based on the comparison in regions where a difference is below a predefined threshold;

detect a surgical instrument in the laparoscopic images and adjusting the visual representation of the 3D model to avoid obscuring the surgical instrument; and generate composite images using the laparoscopic images and the adjusted visual representation of the 3D model.

14. The system according to claim 13, wherein the computer being configured to perform at least one of the comparison and the adjustment of the visual representation of the 3D model at least one of at pixel level of the laparoscopic images and in segments of multiple pixels.

15. The system according to claim 13, wherein the computer being configured to at least one of reduce the brightness of the laparoscopic images and increase the brightness of the visual representation of the 3D model.

16. The system according to claim 13, wherein the computer is configured to perform the detection of the surgical instrument by at least one of object recognition and edge detection.

17. The system according to claim 13, wherein the computer being configured to leave out details from an inner region of the 3D model of the object.

18. The system according to claim 13, wherein the computer being configured to render at least one of outer contours of the 3D model and pre-determined edges of the 3D model including the outer contours of the 3D model.

19. The system according to claim 13, wherein the computer being configured to outline outer contours of the 3D model in two or more contrasting colors or two brightnesses.

20. Non-transitory computer-readable storage medium storing instructions that cause a computer to at least perform:

analyzing laparoscopic images taken during a laparoscopic procedure using a video laparoscope relative to visibility of an object;

calculating a placement of a pre-generated 3D model of the object relative to a location of the object in the laparoscopic images;

generating a visual representation of the 3D model;

comparing at least one of color information and brightness information of the visual representation of the 3D model and of the laparoscopic images at the location of the 3D model and adjusting the visual representation of the 3D model, wherein adjusting the visual representation of the 3D model comprises adjusting the visual representation of the 3D model to have greater contrast to the laparoscopic images based on the comparison in regions where a difference in at least one of color information and brightness information between the 3D model and the laparoscopic images is below a predefined threshold;

detecting a surgical instrument in the laparoscopic images and adjusting the visual representation of the 3D model to avoid obscuring the surgical instrument; and generating composite images using the laparoscopic images and the adjusted visual representation of the 3D model.

\* \* \* \* \*